E. C. FEARNOW.
CONTAINER FOR TRANSPORTING AND STORING LIVE FISH, FISH FRY, AND FISH EGGS.
APPLICATION FILED JUNE 26, 1922.

1,435,457.

Patented Nov. 14, 1922.

Inventor
Edgar C. Fearnow

E. C. FEARNOW.
CONTAINER FOR TRANSPORTING AND STORING LIVE FISH, FISH FRY, AND FISH EGGS.
APPLICATION FILED JUNE 26, 1922.

1,435,457.

Patented Nov. 14, 1922.
2 SHEETS—SHEET 2.

Inventor
Edgar C. Fearnow

By

Attorney

Patented Nov. 14, 1922.

1,435,457

UNITED STATES PATENT OFFICE.

EDGAR C. FEARNOW, OF CAPITOL HEIGHTS, MARYLAND.

CONTAINER FOR TRANSPORTING AND STORING LIVE FISH, FISH FRY, AND FISH EGGS.

Application filed June 26, 1922. Serial No. 571,070.

(FILED UNDER THE ACT OF MARCH 3, 1883, 22 STAT. L., 625.)

*To all whom it may concern:*

Be it known that I, EDGAR C. FEARNOW, a citizen of the United States, residing at Capitol Heights, in the county of Prince Georges and State of Maryland, have invented certain new and useful Improvements in Containers for Transporting and Storing Live Fish, Fish Fry, and Fish Eggs, of which the following is a specification.

The invention described herein may be used by the government or any of its officers or employees in the prosecution of work for the government or by any other person in the United States without the payment to me of any royalty thereon, as provided by the act of March 3, 1883 (22 U. S. Stat. at L. 625).

Among the many problems attendant upon the successful shipment and storage of live fish, fry and eggs is that of maintaining the purity of the water. In permanent tanks this is sometimes accomplished by providing a constant flow of fresh water by a suitable arrangement of inlet and outlet pipes. However, a constant supply of fresh running water is not always available, in which case the cleansing of the tanks is exceedingly difficult.

During shipment the fish, fry or eggs are usually transported in cans of relatively small capacity in which there is no provision for purifying the water. The water must be poured or dipped out and replaced manually, a laborious and unsatisfactory method.

Pollution results chiefly from the excrement of the fish which settles to the bottom of the tank or container and, in practice, is eliminated in the ordinary types of tanks and containers by replacing the entire amount of water contained therein with a fresh supply.

In addition to maintaining the purity of the water it is also essential that the temperature of the water should be kept practically constant. In the case of permanent tanks having a constant supply of running water this is an easy matter to regulate. As to shipping tanks and other containers not so equipped, the temperature in the tanks or containers is sometimes regulated by means of ice which ordinarily is packed upon perforated covers of the containers. As the ice melts the cold water drips through the perforations into the container. This, of course, increases the amount of water in the containers with the resulting liability of overflowing and possible loss of fish.

The object of my invention is primarily to provide a simple and efficient means for removing sediment and pollution from the container, and secondarily to provide means for maintaining the water level at a substantially fixed point.

I accomplish these results by combining with a tank or a container of any desired type a siphon so arranged that by tilting the container, or by the addition of water to the container, by the melting of ice or otherwise, the siphon may be submerged and caused to operate to remove sediment and polluting matter and to reduce the quantity of water within the container to a predetermined amount.

Several embodiments of my invention are illustrated by the accompanying drawings.

Figures 1, 2:
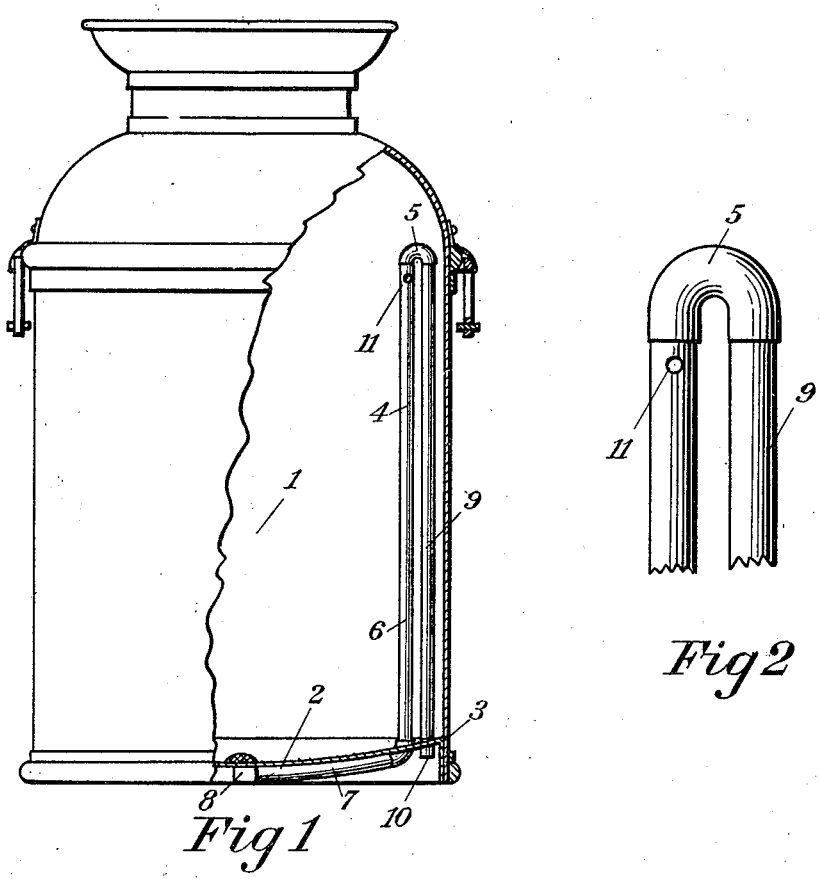
Figure 1 is a perspective view partly broken away and in section of a container equipped with my invention.
Figure 2 is a fragmentary vertical detail view of the siphon of Figure 1, showing in detail the means whereby the action of the siphon is automatically stopped at a given point.

The device illustrated by Figure 1 consists of the container 1, which, in this instance, resembles an ordinary 10-gallon milk can. This shape has been extensively used by hatcheries for the shipment of live fish because water is not likely to slop out of it unless it is filled too full. The bottom 2 of the container is shown dished downwardly somewhat and is connected with the body of the container a short distance above the lower edge, as at 3, so that a space will be preserved between the bottom and any surface upon which the container may be placed. Within the container 1 is a siphon 4 shown as a pipe principally in the shape of an inverted U. The top 5 of the siphon is located at the highest point to which it is desired to permit the water within the container to rise. The intake leg 6 of the siphon passes through the bottom of the container and connects with a pipe 7 which runs along the underside of the bottom to its center 8, where it connects with an aperture in the bottom 2. A discharge leg 9 is shown passing through the bottom 2 of the container at 10, terminating in the space beneath the bottom of the container already referred to. At the point in the container at which it is desired to establish the normal water level, one or more small holes 11 are drilled through the intake leg 6 of the siphon. In use the container 1 is filled with water to the desired level which corresponds with the small holes 11 in the intake leg 6 of the siphon. Under these conditions the siphon will remain inoperative and the water level constant. If the water level rises, however, because of the melting of ice which may be packed in the neck of the container, or for any other cause, so that the top 5 of the siphon becomes submerged, the siphon will automatically function and will draw water through the opening 8 in the bottom of the container and discharge it through the discharge leg 9 of the siphon. This action will continue until the water level within the container falls sufficiently to uncover the small openings 11 in the intake leg 6 of the siphon, whereupon the air which will pass into the siphon through the holes 11 will immediately stop its action. This arrangement provides a very strong suction at the intake end and will be found sufficient to draw off the greater part of the sediment and polluting matter which has settled at the bottom of the container.

The siphon may be caused to function regardless of the water level whenever it is desired to remove polluting matter by simply tilting the container so that the siphon is entirely submerged and tilting it back again when the desired result has been accomplished, after which water may be added to re-establish the desired normal level. The siphon arrangement will also make it impossible for the container to be filled too full since the siphon will function as soon as its top 5 becomes submerged and will automatically reduce the water level to the desired normal.

Figure 3:
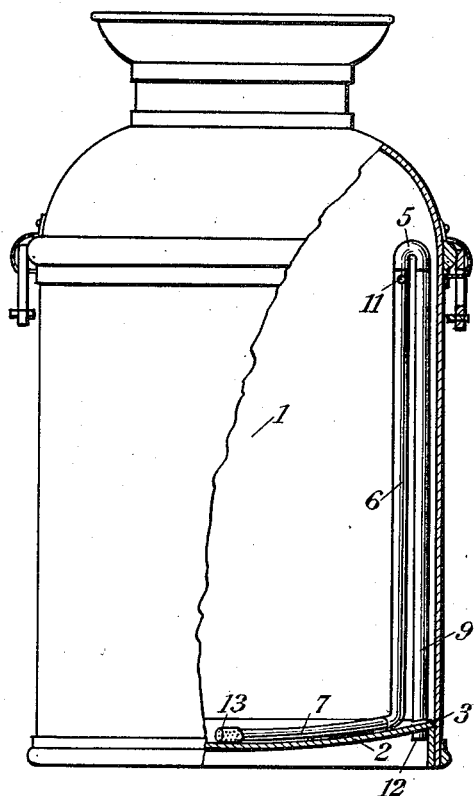
Figures 3 and 4 are perspective views partly in section of containers equipped with other forms of my invention.

The siphon of Figure 1 is also shown in Figure 3, in which the entire siphon with the exception of the end 12 of the discharge leg 9 is located within the container, the extension 7 of the intake leg 6, being shown positioned within the container. This extension 7 may be of the same material as the siphon, or, if preferred, may be made of rubber or other flexible material so that it may be moved or may fall by gravity to the lowermost part of the container or that portion of the container from which it is desired to remove sediment. The intake end of this siphon may be covered with a strainer 13 if desired to prevent small fish, fry or eggs from being siphoned out.

Figure 4:
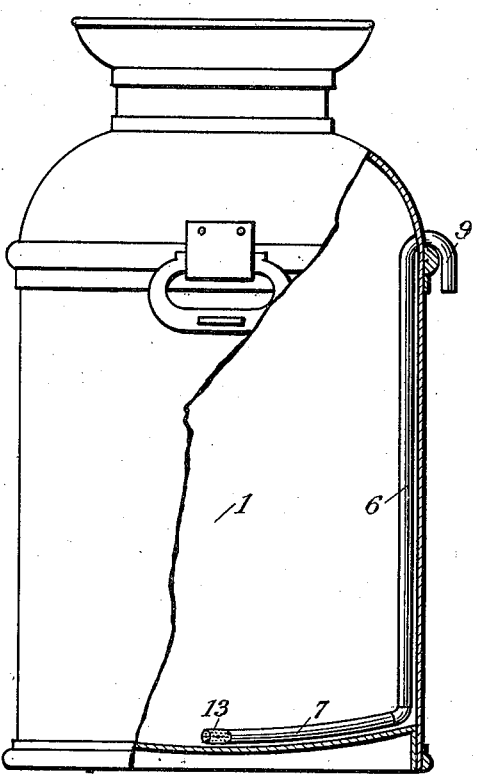

In Fig. 4 the siphon is not perforated at the desired water level, the small openings 11 being omitted. The discharge leg 9 of the siphon, instead of terminating below the bottom of the container, passes through the body of the container, terminating on the outside of the container at a point which corresponds with the desired level of the water within the container.

Figure 5:
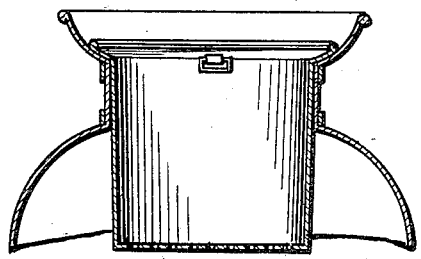
Figure 5 is a vertical cross section of the upper part of a container with an improved type of tray for holding ice.

A convenient and improved form of receptacle for ice is illustrated by Figure 5 wherein a simple perforated pan is shown securely and conveniently mounted in the upper end of an ordinary can. The shape, of course, may be modified to adapt it to any type of container.

It will be understood that my invention is not limited to the exact construction of the drawings but is subject to modification in order to adapt it to containers and tanks of various sizes and shapes without departing from the spirit of the invention.

I claim as my invention:

1. A container of the class described having a siphon fixedly mounted therein and terminating at its intake end in a flexible portion adapted to be directed to the lowest portion of the container when moved to various positions for the purpose of facilitating the removal of sediment and polluting matter from the container.

2. A container of the class described having a concave bottom, a siphon fixedly mounted therein and terminating at its intake end in a flexible, dirigible portion co-operating with the bottom of the container to automatically gravitate to the lowest portion thereof, regardless of the position of the container for the purpose of facilitating the removal of sediment and polluting matter therefrom.

EDGAR C. FEARNOW.